US012615211B2

(12) United States Patent
Chen et al.

(10) Patent No.: US 12,615,211 B2
(45) Date of Patent: Apr. 28, 2026

(54) METHOD AND APPARATUS FOR RECEIVING BORDER GATEWAY PROTOCOL ROUTING, AND METHOD AND APPARATUS FOR SENDING BORDER GATEWAY PROTOCOL ROUTING, AND STORAGE MEDIUM

(71) Applicant: ZTE Corporation, Shenzhen (CN)

(72) Inventors: Ran Chen, Shenzhen (CN); Chunning Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 290 days.

(21) Appl. No.: 18/695,408

(22) PCT Filed: Sep. 5, 2022

(86) PCT No.: PCT/CN2022/117072
§ 371 (c)(1),
(2) Date: Mar. 26, 2024

(87) PCT Pub. No.: WO2023/051179
PCT Pub. Date: Apr. 6, 2023

(65) Prior Publication Data
US 2024/0396833 A1     Nov. 28, 2024

(30) Foreign Application Priority Data

Sep. 30, 2021     (CN) .......................... 202111166339.5

(51) Int. Cl.
*H04L 45/745*     (2022.01)
*H04L 12/46*     (2006.01)
*H04L 45/50*     (2022.01)
(52) U.S. Cl.
CPC ........ *H04L 45/745* (2013.01); *H04L 12/4641* (2013.01); *H04L 45/50* (2013.01)

(58) Field of Classification Search
CPC ... H04L 45/745; H04L 12/4641; H04L 45/50; H04L 45/00; H04L 45/74
See application file for complete search history.

(56) References Cited

U.S. PATENT DOCUMENTS

| | | | |
|---|---|---|---|
| 7,411,955 B2* | 8/2008 | Li | ........................... H04L 45/00 |
| | | | 370/392 |
| 7,787,396 B1* | 8/2010 | Nalawade | ............... H04L 45/20 |
| | | | 370/254 |

(Continued)

FOREIGN PATENT DOCUMENTS

| | | |
|---|---|---|
| CN | 102611632 A | 7/2012 |
| CN | 110505152 A | 11/2019 |

(Continued)

OTHER PUBLICATIONS

Anonymous Brian , et al., "Understanding BGP Outbound Route Filtering (BGP ORF)", May 5, 2008, XP093216511.

(Continued)

*Primary Examiner* — David R Lazaro
(74) *Attorney, Agent, or Firm* — CANTOR COLBURN LLP

(57)     ABSTRACT

Provided in the embodiments of the present disclosure are a method and apparatus for receiving border gateway protocol routing, and a method and apparatus for sending border gateway protocol routing, and a storage medium. The receiving method includes: Virtual Private Network (VPN) service routing is received by a first Provider Edge (PE) device in a first domain from a second PE device in a second domain, where the VPN service routing includes an address of the second PE device; an Outbound Route Filtering (ORF) entry strategy is generated by the first PE device according to the VPN service routing, and the ORF entry strategy is sent to a border device, where the ORF entry strategy includes the address of the second PE device; and (Continued)

A first PE device in a first domain receives VPN service routing of a second PE device in a second domain, and the VPN service routing includes an address of the second PE device ⟋ S202

The first PE device generates an ORF entry strategy according to the VPN service routing, and sends the ORF entry strategy to a border device; and the ORF entry strategy includes the address of the second PE device ⟋ S204

The first PE device receives BGP routing matching the ORF entry strategy and sent by the border device ⟋ S206

Border Gateway Protocol (BGP) routing matching the ORF entry strategy and sent by the border device is received by the first PE device.

20 Claims, 6 Drawing Sheets

(56) References Cited

U.S. PATENT DOCUMENTS

| | | | | |
|---|---|---|---|---|
| 7,990,893 | B1 * | 8/2011 | Singh | H04L 45/04 |
| | | | | 370/254 |
| 9,106,530 | B1 * | 8/2015 | Wang | H04L 45/033 |
| 12,489,655 | B2 * | 12/2025 | Wang | H04L 45/04 |
| 2004/0037275 | A1 * | 2/2004 | Li | H04L 45/00 |
| | | | | 370/370 |
| 2006/0245374 | A1 * | 11/2006 | Patel | H04L 45/033 |
| | | | | 370/254 |
| 2007/0133406 | A1 * | 6/2007 | Vasseur | H04L 45/02 |
| | | | | 370/230 |
| 2007/0258447 | A1 * | 11/2007 | Raszuk | H04L 45/04 |
| | | | | 370/389 |
| 2014/0052876 | A1 * | 2/2014 | Zeng | H04L 12/4641 |
| | | | | 709/245 |
| 2015/0312055 | A1 * | 10/2015 | Varga | H04L 45/04 |
| | | | | 370/254 |
| 2021/0184963 | A1 * | 6/2021 | Sun | H04L 45/033 |
| 2023/0123614 | A1 * | 4/2023 | Wang | H04L 65/1069 |
| | | | | 370/254 |
| 2024/0396833 | A1 * | 11/2024 | Chen | H04L 45/04 |

FOREIGN PATENT DOCUMENTS

| | | | | |
|---|---|---|---|---|
| CN | 110875882 | A | 3/2020 | |
| EP | 2717519 | B1 * | 8/2016 | H04L 45/04 |

OTHER PUBLICATIONS

Chen Cisco Systems Y Rekhter Juniper Networks, "Outbound Route Filtering Capability for BGP-4; rfc5291.txt", Aug. 1, 2008, XP015060278.

European Search for corresponding application EP22874570; Mail date Nov. 13, 2024.

International Search Report PCT/CN2022/117072 filed Sep. 5, 2022; Mail date Dec. 8, 2022.

* cited by examiner

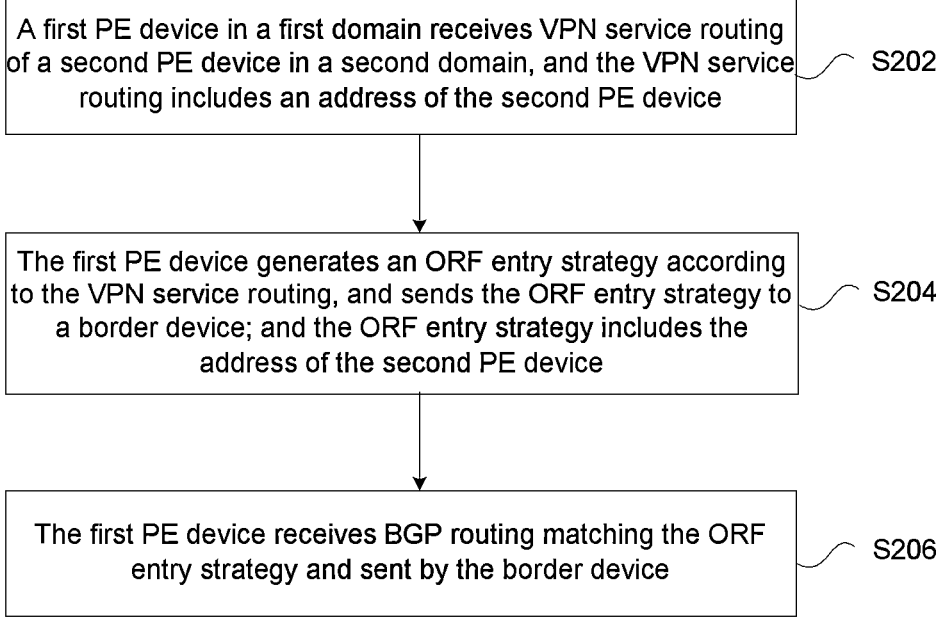

A first PE device in a first domain receives VPN service routing of a second PE device in a second domain, and the VPN service routing includes an address of the second PE device          S202

The first PE device generates an ORF entry strategy according to the VPN service routing, and sends the ORF entry strategy to a border device; and the ORF entry strategy includes the address of the second PE device          S204

The first PE device receives BGP routing matching the ORF entry strategy and sent by the border device          S206

Fig. 2

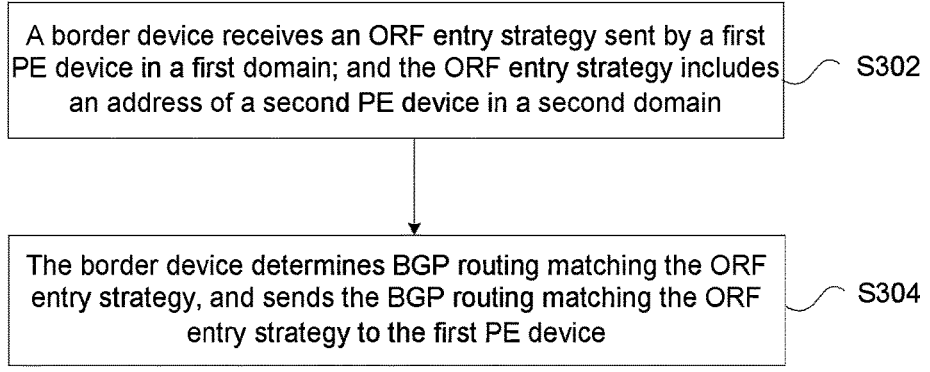

A border device receives an ORF entry strategy sent by a first PE device in a first domain; and the ORF entry strategy includes an address of a second PE device in a second domain — S302

The border device determines BGP routing matching the ORF entry strategy, and sends the BGP routing matching the ORF entry strategy to the first PE device — S304

Fig. 3

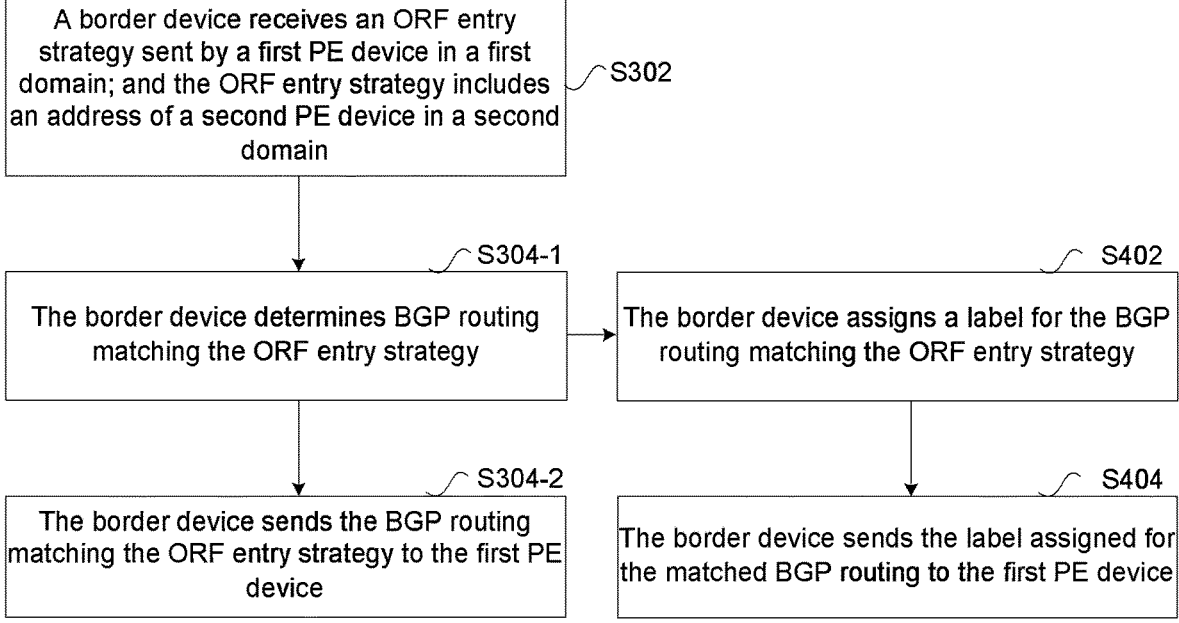

A border device receives an ORF entry strategy sent by a first PE device in a first domain; and the ORF entry strategy includes an address of a second PE device in a second domain — S302

The border device determines BGP routing matching the ORF entry strategy — S304-1

The border device assigns a label for the BGP routing matching the ORF entry strategy — S402

The border device sends the BGP routing matching the ORF entry strategy to the first PE device — S304-2

The border device sends the label assigned for the matched BGP routing to the first PE device — S404

Fig. 4

METHOD AND APPARATUS FOR RECEIVING BORDER GATEWAY PROTOCOL ROUTING, AND METHOD AND APPARATUS FOR SENDING BORDER GATEWAY PROTOCOL ROUTING, AND STORAGE MEDIUM

CROSS-REFERENCE TO RELATED APPLICATION

The present disclosure is a national stage filing under 35 U.S.C. § 371 of international application number PCT/CN2022/117072, filed Sep. 5, 2022, which claims the benefit of priority of Chinese patent application No. CN202111166339.5, filed on Sep. 30, 2021, the entire contents of which are incorporated herein by reference.

TECHNICAL FIELD

Embodiments of the present disclosure relate to the field of communications, and specifically to a method and apparatus for receiving Border Gateway Protocol (BGP) routing, and a method and apparatus for sending BGP routing, and a storage medium.

BACKGROUND

RFC8277 defines a mechanism for establishing a Multi-Protocol Label Switching (MPLS) Label Switch Path (LSP) for a BGP prefix, referred to as a BGP Labeled Unicast (BGP-LU) mechanism. The mechanism can establish, in MPLS Virtual Private Network (VPN) service deployment, the end-to-end MPLS LSP crossing an Autonomour System (AS) and an Interior Gateway Protocol (IGP) domain.

Color-Aware Routing (BGP CAR) and Classful Transport (BGP CT) routing both are extensions based on a BGP, and support an end-to-end path transmission network based on color awareness.

In an end-to-end cross-domain networking solution, BGP-LU or BGP CAR routing or BGP CT routing may be used to complete the splicing of different domains, so as to break through the transmission network. A BGP-LU or BGP CAR routing or BGP CT routing and label scale in the transmission network is determined by the number of Provider Edge (PE) node devices (also known as PE nodes or PE devices). In a transmission network supporting color awareness, the scale is determined by the product of the number of the PE nodes and the number of colors.

In order to establish an end-to-end tunnel, addresses (also known as prefixes) of the PE devices need to be flooded in a network. Each PE device learns the addresses of all other PE devices. Each border device needs to assign a label for the address of each PE device. In a large-scale network, the number of the PE devices may reach the tens of thousands level. Routing and label resource consumption may reach the hundreds of thousands level if a path transmission network based on color awareness is supported. Not only CAR, but overall, the flooding solution of BGP routing in the related art leads to a significant consumption of routing and label resources.

In conclusion, how to reduce BGP routing and label scales in a transmission network is an urgent problem to be solved currently.

SUMMARY

Embodiments of the present disclosure provide a method and apparatus for receiving BGP routing, and a method and apparatus for sending BGP routing, and a storage medium, to at least solve the problem of huge BGP routing and label scales in a transmission network.

An embodiment of the present disclosure provides a method for receiving BGP routing, including: Virtual Private Network (VPN) service routing from a second PE device in a second domain is received by a first Provider Edge (PE) device in a first domain, where the VPN service routing includes an address of the second PE device; an Outbound Route Filtering (ORF) entry strategy is generated by the first PE device according to the VPN service routing, and the ORF entry strategy sent to a border device, where the ORF entry strategy includes the address of the second PE device; and BGP routing matching the ORF entry strategy and sent by the border device is received by the first PE device.

An embodiment of the present disclosure provides a method for sending BGP routing, including: an ORF entry strategy sent by a first PE device in a first domain is received by a border device, where the ORF entry strategy includes an address of a second PE device in a second domain; and BGP routing matching the ORF entry strategy is determined by the border device, and the BGP routing matching the ORF entry strategy is sent to the first PE device.

An embodiment of the present disclosure provides a apparatus for receiving BGP routing. Located at a first PE device in a first domain, the apparatus includes: a service routing receiving module, configured to receive VPN service routing of a second PE device in a second domain, where the VPN service routing includes an address of the second PE device; a strategy generation module, configured to generate an ORF entry strategy according to the VPN service routing, and send the ORF entry strategy to a border device, where the ORF entry strategy includes the address of the second PE device; and a BGP routing receiving module, configured to receive BGP routing matching the ORF entry strategy and sent by the border device.

An embodiment of the present disclosure provides a apparatus for receiving BGP routing. Located at a border device, the apparatus includes: a strategy receiving module, configured to receive an ORF entry strategy sent by a first PE device in a first domain, where the ORF entry strategy includes an address of a second PE device in a second domain; and a BGP routing sending module, configured to determine BGP routing matching the ORF entry strategy, and send the BGP routing matching the ORF entry strategy to the first PE device.

Still another embodiment of the present disclosure further provides a computer readable storage medium, wherein a computer program is stored in the computer readable storage medium, and the computer program is configured to perform, when executed by a processor, steps in any one of the above method embodiments.

Still another embodiment of the present disclosure further provides an electronic apparatus. The electronic apparatus includes a memory and a processor. The memory stores a computer program. The processor is configured to execute the computer program to perform steps in any one of the above method embodiments.

By means of the embodiments of the present disclosure, the first PE device can generate a local ORF entry strategy according to the VPN service routing sent by the second PE device from an opposite end, and send the ORF entry strategy to the border device, such that the border device can send the BGP routing matching the ORF entry strategy to the PE device. Through the solution, the border device can effectively control the amount of routing flooding and the number of labels assigned (the labels are assigned for announced BGP routing, as long as the scale of routing is reduced, the scale of the labels is inevitably reduced accordingly), such that a routing capacity pressure of a first PE node connected to the border device and the local label resource consumption of the border device are reduced, thereby solving the problem of huge BGP routing and label scales in a transmission network.

BRIEF DESCRIPTION OF THE DRAWINGS

FIG. 2 is a flowchart of a method for receiving BGP routing according to an embodiment of the present disclosure.

FIG. 3 is a flowchart of a method for sending BGP routing according to an embodiment of the present disclosure.

FIG. 4 is an exemplary flowchart of a method for sending BGP routing according to an embodiment of the present disclosure.

DETAILED DESCRIPTION OF THE EMBODIMENTS

In order to establish an end-to-end tunnel, addresses (also known as prefixes) of the PE devices need to be flooded in a network. Each PE device learns the addresses of all other PE devices. Each border device needs to assign a label for the address of each PE device. For example, in an MPLS network, for each Autonomour System Border Router (ASBR) device, an MPLS label needs to be assigned for an address of each PE device. In a large-scale network, the number of the PE devices may reach the tens of thousands level. Routing and label resource consumption may reach the hundreds of thousands level if a path transmission network based on color awareness is supported. Not only CAR, but overall, the flooding solution of BGP routing in the related art leads to a significant consumption of routing and label resources.

A solution for reducing a scale of BGP routing and label resources, which reduces the consumption of routing and label resource by a static configuration strategy. For example, on a PE device, when BGP-LU routing is received, an entry strategy is configured, and only the addresses required are kept, so as to reduce the consumption of routing table resource. For example, on an ASBR device, when the BGP-LU routing is sent to the PE device, an exit strategy is configured, and only the addresses and assignment labels required by PE are sent to reduce the consumption of label resource. However, this static configuration mode has a large amount of configuration and makes it difficult to add new services or change services.

Considering requirements for reducing BGP routing and label scales in a transmission network, and the defects of the static configuration mode, embodiments of the present disclosure provide a method and apparatus for receiving BGP routing, and a method and apparatus for sending BGP routing, and a storage medium. The embodiments of the present disclosure are described below in detail with reference to the drawings and the embodiments.

It is to be noted that terms "first", "second" and the like in the description, claims and the above-mentioned drawings of the present disclosure are used for distinguishing similar objects rather than describing a specific sequence or a precedence order.

Figure 1:
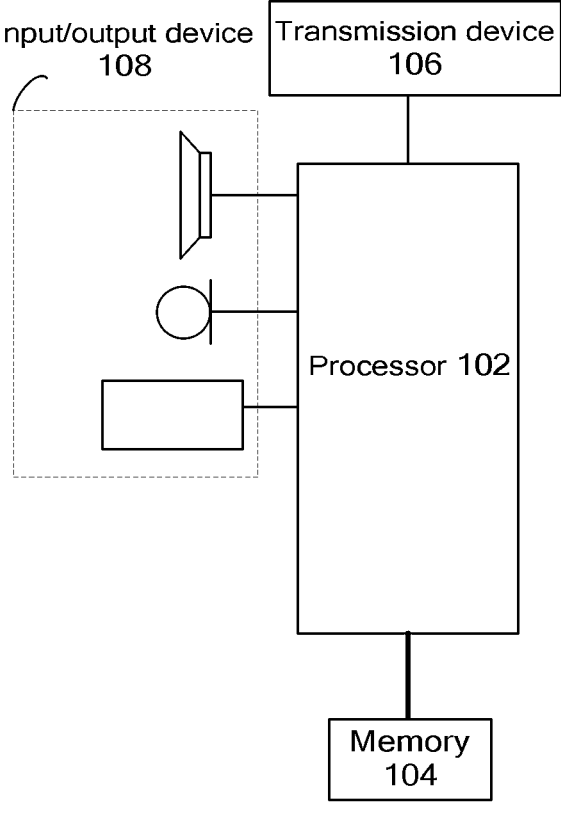
FIG. 1 is a block diagram of a hardware structure of a PE device for implementing a method for receiving BGP routing according to an embodiment of the present disclosure.

Method embodiments of the method for receiving BGP routing provided in the embodiments of the present disclosure may be executed in a PE device. Method embodiments of the method for sending BGP routing provided in the embodiments of the present disclosure may be executed in a border device of a network. The border device may be a border device in a domain, and may also be a border device between the domains. Specifically, the border device may include ABSR or Area Border Routers (ABR). FIG. 1 is a block diagram of a hardware structure of a PE device for implementing a method for receiving BGP routing according to an embodiment of the present disclosure. As shown in FIG. 1, the PE device may include one or more (only one is shown in FIG. 1) processors 102 (the processor 102 may include, but is not limited to, a processing apparatus such as a microprocessor MCU or a programmable logic device FPGA) and a memory 104 for storing data. The above PE device may further include a transmission device 106 for achieving a communication function and an input/output device 108. Those skilled in the art may understand that the structure shown in FIG. 1 is only a schematic diagram, which does not limit the structure of the above PE device. For example, the PE device may also include more or less components than those shown in FIG. 1, or have a different configuration from that shown in FIG. 1.

The memory 104 may be configured to store a computer program, for example, a software program and a module of application software, such as a computer program corresponding to a method for receiving BGP routing in the embodiments of the present disclosure. The processor 102 operates the computer program stored in the memory 104, so as to execute various functional applications and data processing, that is, to realize the above method. The memory 104 may include a high-speed random access memory, and may further include a non-volatile memory, such as one or more magnetic disk memory apparatuses, a flash memory device, or other non-volatile solid-state memory devices. In some embodiments, the memory 104 may further include memories remotely disposed relative to the processor 102. The remote memories may be connected to a border device via a network. Examples of the above network include, but are not limited to, the Internet, an intranet, a local area network, a mobile communication network, and a combination thereof.

It is to be noted that, the structure of the border device for implementing a method for sending BGP routing is basically the same as the structure of the PE device shown in FIG. 1 in terms of a basic structural architecture. Definitely, depending on respective functions, there are differences in processing performance requirements.

This embodiment provides a method for receiving BGP routing. The method is applied to a PE device. FIG. 2 is a flowchart of a method for receiving BGP routing according to an embodiment of the present disclosure. As shown in FIG. 2, the flow includes the following steps.

At S202, a first PE device in a first domain receives VPN service routing of a second PE device in a second domain, and the VPN service routing includes an address of the second PE device.

In some exemplary implementations, the first domain and the second domain may be an MPLS domain or an SRv6 domain, which may have the same or different types.

At S204, the first PE device generates an ORF entry strategy according to the VPN service routing, and sends the ORF entry strategy to a border device; and the ORF entry strategy includes the address of the second PE device.

In this step, the border device includes one of the following: a border device of the first domain, and a border device between the first domain and the second domain. In terms of the type of the border device, one of the following may be included: ASBR and ABR.

In this step, the ORF entry strategy is generated by the first PE device according to the VPN service routing, which is a dynamic configuration mode of the ORF entry strategy. Compared with the foregoing static configuration mode, the dynamic configuration mode can adjust the strategy in real time according to the received VPN service routing, and can easily and flexibly adapt to requirements of service addition, deletion, and modification.

In some exemplary implementations, the first PE device in S204 automatically generates the ORF entry strategy according to the VPN service routing. For example, information of the ORF entry strategy may be automatically acquired from VPN routing. In this case, the process of the first PE device generating the ORF entry strategy is substantially equivalent to the fact that the first PE device acquires the address of the second PE device from the VPN service routing as the ORF entry strategy, such that the first PE device may complete autonomous and automatic generation of the ORF entry strategy, thereby greatly reducing workload for configuration.

A BGP neighbor may be directly establish between the border device and the first PE device, or with the presence of a Route Reflector (RR), the BGP neighbor is not directly established between the first PE device and the border device, but the first PE device and the border device establish the BGP neighbors respectively with the RR. Based on different cases, the process that the first PE device sends the ORF entry strategy to the border device in S204 may be respectively implemented by using the following manners.

When the BGP neighbor is established between the first PE device and the border device, the first PE device directly sends the ORF entry strategy by the first PE device to the border device.

When the BGP neighbor is established between the first PE device and the RR and the BGP neighbor is established between the RR and the border device, the first PE device sends the ORF entry strategy to the border device via the RR.

At S206, the first PE device receives BGP routing matching the ORF entry strategy and sent by the border device. Moreover, in some exemplary embodiments, the first PE device may further receive a label assigned for the matched BGP routing sent by the border device.

In some exemplary embodiments, the BGP routing may include one of the following: BGP-LU routing, BGP-CAR routing, and BGP-CT routing.

In some exemplary embodiments, the BGP routing matching the ORF entry strategy may be BGP routing with the prefix consistent with the address of the second PE device in the ORF entry strategy.

As described above, the BGP neighbor may be directly establish between the border device and the first PE device, or with the presence of the RR, the BGP neighbor is not directly established between the first PE device and the border device, but the first PE device and the border device establish the BGP neighbors respectively with the RR. Similar to the process that the first PE device sends the ORF entry strategy to the border device in S204, based on different cases, the process that the first PE device receives the BGP routing matching the ORF entry strategy and sent by the border device in S206 may be respectively implemented by using the following manners.

When the BGP neighbor is established between the first PE device and the border device, the first PE device receives the BGP routing matching the ORF entry strategy and sent by the border device.

When the BGP neighbor is established between the first PE device and the RR and the BGP neighbor is established between the RR and the border device, the first PE device receives the BGP routing matching the ORF entry strategy and sent by the border device via the RR.

In some exemplary embodiments, the method may further include a step of enabling a VPN address family capability and a BGP address family capability. Definitely, those skilled in the art should know that the VPN address family capability and the BGP address family capability may also be enabled by default, depending on factory configuration or networking requirements of devices. In this case, the method does not need to include the step of enabling the VPN address family capability and the BGP address family capability.

In some exemplary embodiments, the method may further include a step of enabling an ORF sending and receiving capability. Definitely, those skilled in the art should know that the ORF sending and receiving capability may also be default or be in an enabled state by default, depending on factory configuration or networking requirements of devices. In this case, the method does not need to include the step of enabling the ORF sending and receiving capability.

According to a connection condition between the first PE device and the border device, the step of enabling the ORF sending and receiving capability may be respectively implemented by the following manners.

When the BGP neighbor is established between the first PE device and the border device, the ORF sending and receiving capability between first PE device and the border device is enabled. For example, according to requirements of the first PE device sending the ORF entry strategy to the border device in S204, an ORF sending capability of the first PE device and an ORF receiving capability of the border device may be enabled.

When the BGP neighbor is established between the first PE device and the RR and the BGP neighbor is established between the RR and the border device, the ORF sending and receiving capability between the first PE device and the RR and the ORF sending and receiving capability between the RR and the border device are enabled. For example, according to requirements of the first PE device sending the ORF entry strategy to the border device in S204, the ORF sending capability of the first PE device, the ORF receiving capability and ORF sending capability of the RR, and the ORF receiving capability of the border device may be enabled.

To sum up, in the method for receiving BGP routing provided in the embodiments of the present disclosure, the first PE device can generate a local ORF entry strategy according to the VPN service routing sent by the second PE device from an opposite end, and send the ORF entry strategy to the border device, and then the first PE device receives the BGP routing matching the ORF entry strategy from the border device. Through the solution, the border device can effectively control the amount of routing flooding and the number of labels assigned (the labels are assigned for announced BGP routing, as long as the scale of routing is reduced, the scale of the labels is inevitably reduced accordingly), such that a routing capacity pressure of a first PE node connected to the border device is reduced, thereby solving the problem of huge BGP routing scales in a transmission network. Moreover, in terms of the border device, local label resource consumption of the border device is also reduced, such that the problem of huge label scales in a transmission network is solved.

From the above descriptions about the implementation modes, those skilled in the art may clearly know that the method according to the foregoing embodiments may be implemented in a manner of combining software and a necessary universal hardware platform, and of course, may also be implemented through hardware, but the former is a preferred implementation mode under many circumstances. Based on such an understanding, the technical solutions of the embodiments of the present disclosure substantially or parts making contributions to the conventional art may be embodied in form of software product, and the computer software product is stored in a storage medium (for example, a ROM/RAM), a magnetic disk and an optical disk), including a plurality of instructions configured to enable a terminal device (which may be a mobile phone, a computer, a server, a network device, or the like) to execute the method in each embodiment of the present disclosure.

This embodiment provides a method for sending BGP routing. The method is applied to a border device. The border device includes one of the following: a border device of the first domain, and a border device between the first domain and the second domain. In terms of the type of the border device, one of the following may be included: ASBR and ABR. FIG. 3 is a flowchart of a method for sending BGP routing according to an embodiment of the present disclosure. As shown in FIG. 3, the method includes the following steps.

At S302, a border device receives an ORF entry strategy sent by a first PE device in a first domain; and the ORF entry strategy includes an address of a second PE device in a second domain.

A BGP neighbor may be directly establish between the border device and the first PE device, or with the presence of an RR, the BGP neighbor is not directly established between the first PE device and the border device, but the first PE device and the border device establish the BGP neighbors respectively with the RR. Based on different cases, the process that the border device receives the ORF entry strategy to the first PE device in the first domain in S302 may be respectively implemented by using the following manners.

When the BGP neighbor is established between the first PE device and the border device, the border device directly receives the ORF entry strategy sent by the first PE device.

When the BGP neighbor is established between the first PE device and the RR and the BGP neighbor is established between the RR and the border device, the border device receives the ORF entry strategy sent by the first PE device via the RR.

At S304, the border device determines BGP routing matching the ORF entry strategy, and sends the BGP routing matching the ORF entry strategy to the first PE device.

S304 may be divided into two steps according to actions.

At S304-1, the border device determines BGP routing matching the ORF entry strategy.

At S304-2, the border device sends the BGP routing matching the ORF entry strategy to the first PE device.

In some exemplary embodiments, the BGP routing includes one of the following: BGP-LU routing, BGP-CAR routing, and BGP-CT routing.

In some exemplary embodiments, S304-1 may include: the border device determines BGP routing with a prefix consistent with the address of the second PE device in the ORF entry strategy as the BGP routing matching the ORF entry strategy.

In some exemplary embodiments, after the border device determines the BGP routing matching the ORF entry strategy, for the BGP routing not matching the ORF entry strategy, the border device may perform discarding processing, or take other processing methods according to configuration.

As described above, the BGP neighbor may be directly establish between the border device and the first PE device, or with the presence of the RR, the BGP neighbor is not directly established between the first PE device and the border device, but the first PE device and the border device establish the BGP neighbors respectively with the RR. Similar to the process that the border device receives the ORF entry strategy to the first PE device in the first domain in S302, based on different cases, the process that the border device sends the BGP routing matching the ORF entry strategy to the first PE device may be respectively implemented by using the following manners.

When the BGP neighbor is established between the first PE device and the border device, the border device directly sends the BGP routing matching the ORF entry strategy to the first PE device.

When the BGP neighbor is established between the first PE device and the RR and the BGP neighbor is established between the RR and the border device, the border device sends the BGP routing matching the ORF entry strategy to the first PE device via the RR.

FIG. 4 is an exemplary flowchart of a method for sending BGP routing according to an embodiment of the present disclosure. As shown in FIG. 4, the method further includes:

At S402, the border device assigns a label for the BGP routing matching the ORF entry strategy.

It is to be noted that, S402 is executed after S304-1, but has no specific execution sequence requirement with S304-2.

After S402, the method may further include the following steps.

At S404, the border device sends the label assigned for the matched BGP routing to the first PE device.

The matched BGP routing sent by the border device to the first PE device in S304-2 and the label assigned for the matched BGP routing sent to the first PE device in S404 may be simultaneously sent, or may be sent respectively, and the embodiments of the present disclosure are not limited thereto.

In some exemplary embodiments, the method may further include a step of enabling a VPN address family capability and a BGP address family capability. Definitely, those skilled in the art should know that the VPN address family capability and the BGP address family capability may also be default or be in an enabled state by default, depending on factory configuration or networking requirements of devices. In this case, the method does not need to include the step of enabling the VPN address family capability and the BGP address family capability.

In some exemplary embodiments, the method may further include a step of enabling an ORF sending and receiving capability. Definitely, those skilled in the art should know that the ORF sending and receiving capability may also be default or be in an enabled state by default, depending on factory configuration or networking requirements of devices. In this case, the method does not need to include the step of enabling the ORF sending and receiving capability.

According to a connection condition between the first PE device and the border device, the step of enabling the ORF sending and receiving capability may be respectively implemented by the following manners.

When the BGP neighbor is established between the first PE device and the border device, the ORF sending and receiving capability between first PE device and the border device is enabled. For example, according to requirements of the border device receiving the ORF entry strategy sent by the first PE device in the first domain in S302, an ORF sending capability of the first PE device and an ORF receiving capability of the border device may be enabled.

When the BGP neighbor is established between the first PE device and the RR and the BGP neighbor is established between the RR and the border device, the ORF sending and receiving capability between the first PE device and the RR and the ORF sending and receiving capability between the RR and the border device are enabled. For example, according to requirements of the border device receiving the ORF entry strategy sent by the first PE device in the first domain in S302, the ORF sending capability of the first PE device, the ORF receiving capability and ORF sending capability of the RR, and the ORF receiving capability of the border device may be enabled.

From the above descriptions about the implementation modes, those skilled in the art may clearly know that the method according to the foregoing embodiments may be implemented in a manner of combining software and a necessary universal hardware platform, and of course, may also be implemented through hardware, but the former is a preferred implementation mode under many circumstances. Based on such an understanding, the technical solutions of the embodiments of the present disclosure substantially or parts making contributions to the conventional art may be embodied in form of software product, and the computer software product is stored in a storage medium (for example, an ROM/RAM), a magnetic disk and an optical disk), including a plurality of instructions configured to enable a terminal device (which may be a mobile phone, a computer, a server, a network device, or the like) to execute the method in each embodiment of the present disclosure.

This embodiment further provides a apparatus for receiving BGP routing. Located at a first PE device in a first domain, the apparatus is configured to implement the foregoing embodiments and the preferred implementation of the method for receiving BGP routing, and what has been described will not be described again. As used below, the term "module" may be a combination of software and/or hardware that implements a predetermined function. Although the apparatus described in the following embodiments is preferably implemented in software, but implementations in hardware, or a combination of software and hardware, are also possible and conceived.

Figure 5:
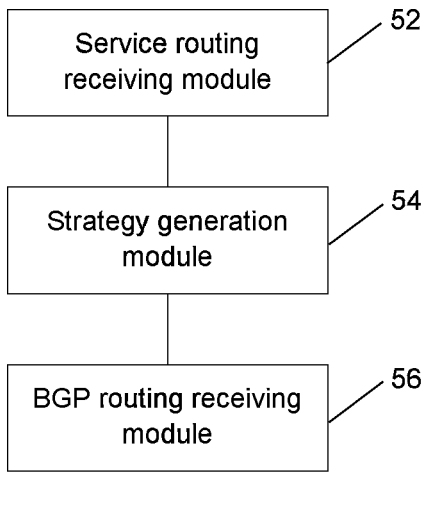
FIG. 5 is a structural block diagram of a apparatus for receiving BGP routing according to an embodiment of the present disclosure.

FIG. 5 is a structural block diagram of a apparatus for receiving BGP routing according to an embodiment of the present disclosure. As shown in FIG. 5, the apparatus includes a service routing receiving module 52, a strategy generation module 54, and a BGP routing receiving module 56.

The service routing receiving module 52 is configured to receive VPN service routing of a second PE device in a second domain. The VPN service routing includes an address of the second PE device.

The strategy generation module 54 is configured to generate an ORF entry strategy according to the VPN service routing, and send the ORF entry strategy to a border device. The ORF entry strategy includes the address of the second PE device.

The BGP routing receiving module 56 is configured to receive BGP routing matching the ORF entry strategy and sent by the border device.

It is to be noted that, each of the above modules may be implemented by software or hardware. For the latter, it may be implemented in the following manners, but is not limited to the follow: the above modules are all located in a same processor; or the above modules are located in different processors in any combination.

This embodiment further provides a apparatus for sending BGP routing. Located at a border device, the apparatus is configured to implement the foregoing embodiments and the preferred implementation of the method for sending BGP routing, and what has been described will not be described again. As used below, the term "module" may be a combination of software and/or hardware that implements a predetermined function. Although the apparatus described in the following embodiments is preferably implemented in software, but implementations in hardware, or a combination of software and hardware, are also possible and conceived.

Figure 6:
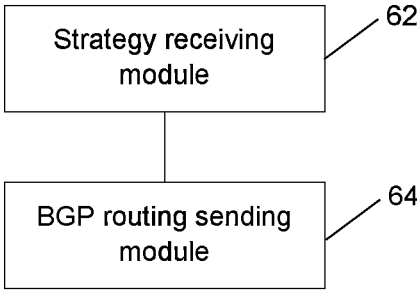
FIG. 6 is a structural block diagram of a apparatus for sending BGP routing according to an embodiment of the present disclosure.

FIG. 6 is a structural block diagram of a apparatus for sending BGP routing according to an embodiment of the present disclosure. As shown in FIG. 6, the apparatus includes a strategy receiving module 62 and a BGP routing sending module 64.

The strategy receiving module 62 is configured to receive an ORF entry strategy sent by a first PE device in a first domain. The ORF entry strategy includes an address of a second PE device in a second domain.

The BGP routing sending module 64 is configured to determine BGP routing matching the ORF entry strategy, and send the BGP routing matching the ORF entry strategy to the first PE device.

It is to be noted that, each of the above modules may be implemented by software or hardware. For the latter, it may be implemented in the following manners, but is not limited to the follow: the above modules are all located in a same processor; or the above modules are located in different processors in any combination.

An embodiment of the present disclosure further provides a computer readable storage medium, wherein a computer program is stored in the computer readable storage medium, and the computer program is configured to perform, when executed by a processor, steps in any one of the above method embodiments.

In an exemplary embodiment, the computer readable storage medium may include, but is not limited to, a USB flash disk, a Read-Only Memory (ROM), a Random Access Memory (RAM), and various media that can store computer programs, such as a mobile hard disk, a magnetic disk, or an optical disk.

An embodiment of the present disclosure further provides an electronic apparatus. The electronic apparatus includes a memory and a processor. The memory stores a computer program.

The processor is configured to execute the computer program to perform steps in any one of method embodiments described above.

In an exemplary embodiment, the electronic apparatus may further include a transmission device and an input/output device. The transmission device is connected to the processor. The input/output device is connected to the processor.

For specific examples in this embodiment, refer to the examples described in the foregoing embodiments and the exemplary implementations, and this embodiment will not be repeated thereto.

Exemplary Embodiment 1

In the description of this embodiment, the amount of routing flooding and the number of labels assigned are controlled by an ASBR, such that a routing capacity pressure of a PE node connected to the ASBR and label resource consumption of an ASBR device are reduced.

Figure 7:
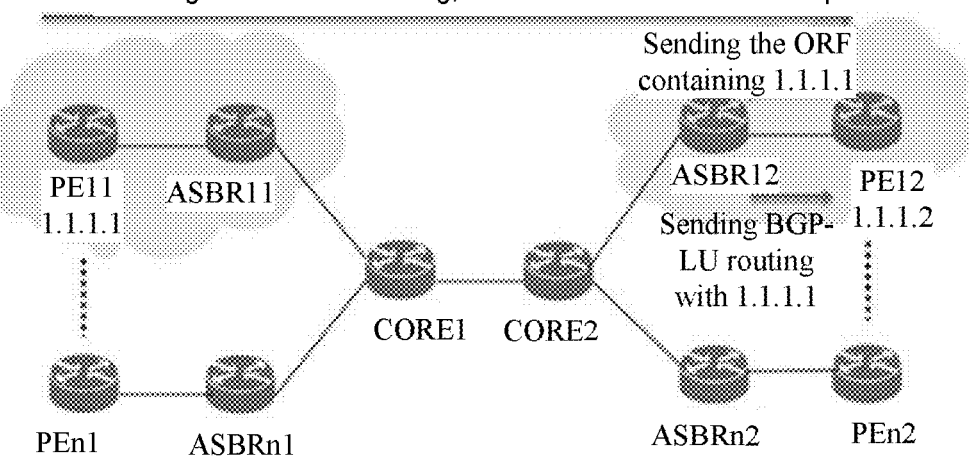
FIG. 7 is a network topological graph according to an exemplary embodiment of the present disclosure.

FIG. 7 is a network topological graph according to an exemplary embodiment of the present disclosure. As shown in FIG. 7, PE11-ASBR11, ASBR11-CORE1, CORE1-CORE2, CORE2-ASBR12, and ASBR12-PE12 respectively establish BGP neighbors, and a VPN address family capability and a BGP-LU address family capability are enabled. An ORF sending and receiving capability (the PE enables the sending capability, and the ASBR enables the receiving capability) between the PE and the ASBR is enabled. Based on network topology shown in FIG. 7, the method includes the following steps.

At S1, if an end-to-end VPN service is opened between a PE 11 and PE 12, the PE 11 sends VPN service routing to an ASBR 11; and through a plurality of transmissions of the BGP neighbors, the PE 12 receives the VPN routing, and an address of a next hop of the VPN routing is an address 1.1.1.1 of the PE 11, as publishing the VPN routing does not modify an original next hop.

At S2, the PE 12 generates a local ORF entry strategy of BGP-LU routing according to the address 1.1.1.1 of the next hop of the VPN routing, and sends the ORF entry strategy to an ASBR 12, where the ORF entry strategy includes a prefix address 1.1.1.1 of the PE 11.

At S3, the ASBR 12 sends the BGP-LU routing to the PE 12, matches same with the received prefix ORF strategy, only sends routing with a prefix being 1.1.1.1 of the PE 11 after matching, and assigns an MPLS label for the routing (in an MPLS network). The addresses of other PE devices with unmatched are no longer sent and are discarded by an ASBR node.

Exemplary Embodiment 2

In the description of this embodiment, the amount of routing flooding and the number of labels assigned are controlled by an ASBR, such that a routing capacity pressure of a PE node connected to the ASBR and label resource consumption of an ASBR device are reduced.

Figure 8:
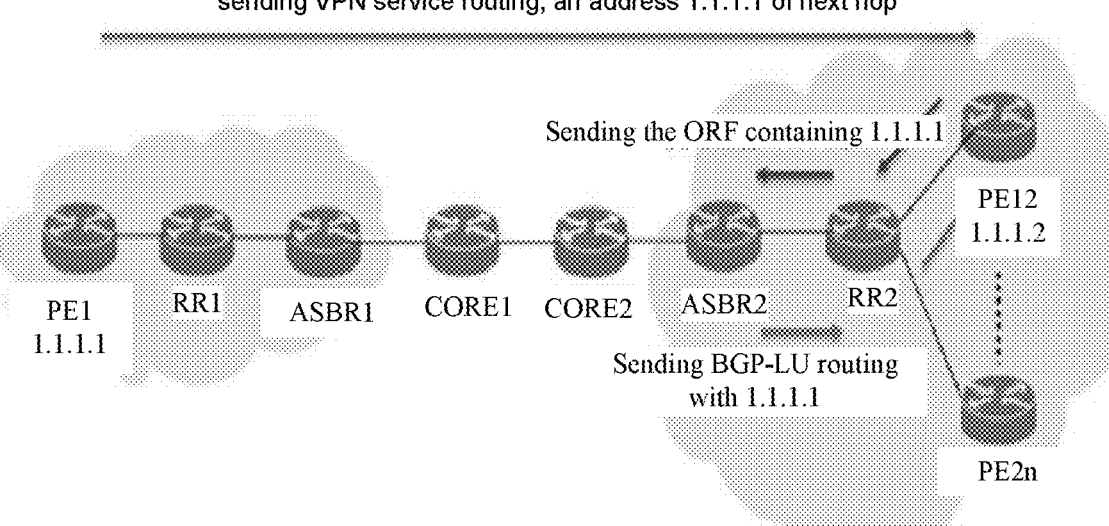
FIG. 8 is another network topological graph according to an exemplary embodiment of the present disclosure.

FIG. 8 is another network topological graph according to an exemplary embodiment of the present disclosure. As shown in FIG. 8, an RR is deployed between a PE and an ASBR PE1-RR1, RR1-ASBR1, ASBR1-CORE1, CORE1-CORE2, CORE2-ASBR2, ASBR2-RR2, and RR2-PE2 respectively establish BGP neighbors, and a VPN address family capability and a BGP-LU address family capability are enabled. An ORF sending and receiving capability (the PE enables the sending capability, and the RR enables the receiving capability) between the PE and the RR is enabled, and an ORF sending and receiving capability (the RR enables the sending capability, and the ASBR enables the receiving capability) between the RR and the ASBR is enabled. Based on network topology shown in FIG. 8, the method includes the following steps.

At S1, if an end-to-end VPN service is opened between a PE 1 and PE 2, the PE 1 sends VPN service routing to an RR 1; and through a plurality of transmissions of the BGP neighbors, the PE 2 receives the VPN routing, and an address of a next hop of the VPN routing is an address 1.1.1.1 of the PE 1.

At S2, the PE 2 generates a local ORF entry strategy of BGP-LU routing according to the address 1.1.1.1 of the next hop of the VPN routing, and sends the ORF entry strategy to an RR 2, where the ORF entry strategy includes a prefix address 1.1.1.1 of the PE 1.

At S3, the RR 2 receives the ORF strategy from the PE 2, and reflects same to an ASBR 2.

At S4, when sending the BGP-LU routing to the PE 2, the ASBR 2 matches the BGP-LU routing with the received prefix ORF strategy, only sends routing with a prefix being 1.1.1.1 after matching, and assigns an MPLS label for the routing (in an MPLS network). The addresses of other PE devices with unmatched are no longer sent.

Exemplary Embodiment 3

In the description of this embodiment, the amount of routing flooding and the number of labels assigned are controlled by an ASBR, such that a routing capacity pressure of a PE node connected to the ASBR and label resource consumption of an ASBR device are reduced.

As shown in FIG. 7, PE11-ASBR11, ASBR11-CORE1, CORE1-CORE2, CORE2-ASBR12, and ASBR12-PE12 respectively establish BGP neighbors, and a VPN address family capability and a BGP-CAR address family capability are enabled. Based on network topology shown in FIG. 7, the method includes the following steps.

At S1, if an end-to-end VPN service is opened between a PE 11 and PE 12, the PE 11 sends VPN service routing to an ASBR 11; and through a plurality of transmissions of the BGP neighbors, the PE 12 receives the VPN routing, and an address of a next hop of the VPN routing is an address 1.1.1.1 of the PE 11, as publishing the VPN routing does not modify an original next hop.

At S2, the PE 12 generates a local ORF entry strategy of BGP-CAR routing according to the address 1.1.1.1 of the next hop of the VPN routing, and sends the ORF entry strategy to an ASBR 12, where the ORF entry strategy includes a prefix address 1.1.1.1 of the PE 11.

At S3, the ASBR 12 sends the BGP-CAR routing to the PE 12, matches same with the received prefix ORF strategy, only sends routing with a prefix being 1.1.1.1 of the PE 11 after matching, and assigns an MPLS label for the routing (in an MPLS network). The addresses of other PE devices with unmatched are no longer sent and are discarded by an ASBR node.

Exemplary Embodiment 4

In the description of this embodiment, the amount of routing flooding and the number of labels assigned are controlled by an ASBR, such that a routing capacity pressure of a PE node connected to the ASBR and label resource consumption of an ASBR device are reduced.

As shown in FIG. 7, PE11-ASBR11, ASBR11-CORE1, CORE1-CORE2, CORE2-ASBR12, and ASBR12-PE12 respectively establish BGP neighbors, and a VPN address family capability and a BGP-CT address family capability are enabled. Based on network topology shown in FIG. 7, the method includes the following steps.

At S1, if an end-to-end VPN service is opened between a PE 11 and PE 12, the PE 11 sends VPN service routing to an ASBR 11; and through a plurality of transmissions of the BGP neighbors, the PE 12 receives the VPN routing, and an address of a next hop of the VPN routing is an address 1.1.1.1 of the PE 11, as publishing the VPN routing does not modify an original next hop.

At S2, the PE 12 generates a local ORF entry strategy of BGP-CAR routing according to the address 1.1.1.1 of the next hop of the VPN routing, and sends the ORF entry strategy to an ASBR 12, where the ORF entry strategy includes a prefix address 1.1.1.1 of the PE 11.

At S3, the ASBR 12 sends the BGP-CT routing to the PE 12, matches same with the received prefix ORF strategy, only sends routing with a prefix being 1.1.1.1 of the PE 11 after matching, and assigns an MPLS label for the routing (in an MPLS network). The addresses of other PE devices with unmatched are no longer sent and are discarded by an ASBR node.

By means of the solution provided in the embodiments of the present disclosure, during end-to-end domain-crossing networking, a VPN service is implemented in the PE device. According to a transmission address of the VPN service (a next hop of the VPN service), a remote PE address required is automatically identified, a prefix ORF entry strategy of BGP-LU routing or BGP CAR routing or BGP CT routing is automatically generated, and the ORF is sent to an upstream neighbor device. When announcing the BGP-LU routing or the BGP CAR routing or the BGP CT routing, the neighbor device only announces the prefix matching the ORF. In this way, routing resources of the PE device and label resource consumption of the ASBR device are automatically reduced.

It is apparent that those skilled in the art should understand that the above-mentioned modules or steps of the embodiments of the present disclosure may be implemented by a general computing device, and may also be gathered together on a single computing device or distributed in network composed of multiple computing devices. The above mentioned modules or steps of the present application may be implemented with program codes executable by the computing device, so that may be stored in a storage device for execution by the computing device, and in some cases, the steps shown or described may be performed in a different sequence than herein, or can be fabricated into individual integrated circuit modules respectively, or multiple modules or steps thereof are fabricated into a single integrated circuit module for implementation. In this way, the embodiments of the present disclosure are not limited to any specific combination of hardware and software.

The above are only the preferred embodiments of the present disclosure and are not intended to limit the embodiments of the present disclosure. For those skilled in the art, the embodiments of the present disclosure may have various modifications and variations. Any modifications, equivalent replacements, improvements and the like made within the principle of the embodiments of the present disclosure all fall within the scope of protection of the embodiments of the present disclosure.

What is claimed is:

1. A method for receiving border gateway protocol routing, comprising:

receiving, by a first Provider Edge (PE) device in a first domain, Virtual Private Network (VPN) service routing of a second PE device in a second domain, wherein the VPN service routing comprises an address of the second PE device;

generating an Outbound Route Filtering (ORF) entry strategy by the first PE device according to the VPN service routing, and sending the ORF entry strategy to a border device, wherein the ORF entry strategy comprises the address of the second PE device; and receiving, by the first PE device, Border Gateway Protocol (BGP) routing matching the ORF entry strategy and sent by the border device.

2. The method according to claim 1, wherein the BGP routing matching the ORF entry strategy comprises:

BGP routing with a prefix consistent with the address of the second PE device in the ORF entry strategy.

3. A computer non-transitory readable storage medium, wherein a computer program is stored in the computer readable storage medium, and the computer program is configured to cause, when executed by a processor, the processor to perform steps of the method as claimed in claim 2.

4. The method according to claim 1, wherein sending, by the first PE device, the ORF entry strategy to the border device comprises one of the following:

when a BGP neighbor is established between the first PE device and the border device, directly sending the ORF entry strategy by the first PE device to the border device; and when a BGP neighbor is established between the first PE device and a Route Reflector (RR) and a BGP neighbor is established between the RR and the border device, sending, by the first PE device, the ORF entry strategy to the border device via the RR.

5. The method according to claim 1, wherein receiving, by the first PE device, the BGP routing matching the ORF entry strategy and sent by the border device comprises one of the following:

when a BGP neighbor is established between the first PE device and the border device, receiving, by the first PE device, the BGP routing matching the ORF entry strategy and sent by the border device; and when a BGP neighbor is established between the first PE device and a RR and a BGP neighbor is established between the RR and the border device, receiving, by the first PE device, the BGP routing matching the ORF entry strategy and sent by the border device via the RR.

6. The method according to claim 1, wherein generating, by the first PE device, the ORF entry strategy according to the VPN service routing comprises:

acquiring, by the first PE device, the address of the second PE device from the VPN service routing as the ORF entry strategy.

7. The method according to claim 1, further comprising one of the following:

when a BGP neighbor is established between the first PE device and the border device, enabling an ORF sending and receiving capability between the first PE device and the border device; and when a BGP neighbor is established between the first PE device and a RR and a BGP neighbor is established between the RR and the border device, enabling an ORF sending and receiving capability between the first PE device and the RR, and an ORF sending and receiving capability between the RR and the border device.

8. The method according to claim 7, wherein
enabling the ORF sending and receiving capability between the first PE device and the border device comprises: enabling an ORF sending capability of the first PE device, and enabling an ORF receiving capability of the border device;
or,
enabling the ORF sending and receiving capability between the first PE device and the RR, and the ORF sending and receiving capability between the RR and the border device comprises:
enabling the ORF sending capability of the first PE device, enabling an ORF receiving capability and ORF sending capability of the RR, and enabling the ORF receiving capability of the border device.

9. The method according to claim 1, wherein the BGP routing comprises one of the following: BGP label unicast routing, BGP Color-Aware Routing (CAR), and BGP Classful Transport (CT) routing.

10. A computer non-transitory readable storage medium, wherein a computer program is stored in the computer readable storage medium, and the computer program is configured to cause, when executed by a processor, the processor to perform steps of the method as claimed in claim 1.

11. A method for sending border gateway protocol routing, comprising:
receiving, by a border device, an Outbound Route Filtering (ORF) entry strategy sent by a first Provider Edge (PE) device in a first domain, wherein the ORF entry strategy comprises an address of a second PE device in a second domain; and
determining, by the border device, Border Gateway Protocol (BGP) routing matching the ORF entry strategy, and sending the BGP routing matching the ORF entry strategy to the first PE device.

12. The method according to claim 11, further comprising:
assigning, by the border device, a label for the BGP routing matching the ORF entry strategy.

13. A computer non-transitory readable storage medium, wherein a computer program is stored in the computer readable storage medium, and the computer program is configured to cause, when executed by a processor, the processor to perform steps of the method as claimed in claim 12.

14. The method according to claim 11, wherein determining, by the border device, the BGP routing matching the ORF entry strategy comprises:
determining, by the border device, BGP routing with a prefix consistent with the address of the second PE device in the ORF entry strategy as the BGP routing matching the ORF entry strategy.

15. The method according to claim 11, wherein receiving, by the border device, the ORF entry strategy sent by the first PE device in the first domain comprises one of the following:

when a BGP neighbor is established between the first PE device and the border device, directly receiving, by the border device, the ORF entry strategy sent by the first PE device; and
when a BGP neighbor is established between the first PE device and a Route Reflector (RR) and a BGP neighbor is established between the RR and the border device, receiving, by the border device, the ORF entry strategy sent by the first PE device via the RR.

16. The method according to claim 11, wherein sending, by the border device, the BGP routing matching the ORF entry strategy to the first PE device comprises one of the following:
when a BGP neighbor is established between the first PE device and the border device, directly sending, by the border device, the BGP routing matching the ORF entry strategy to the first PE device; and
when a BGP neighbor is established between the first PE device and a RR and a BGP neighbor is established between the RR and the border device, sending, by the border device, the BGP routing matching the ORF entry strategy to the first PE device via the RR.

17. The method according to claim 11, further comprising one of the following:
when a BGP neighbor is established between the first PE device and the border device, enabling an ORF sending and receiving capability between the first PE device and the border device; and
when a BGP neighbor is established between the first PE device and a RR and a BGP neighbor is established between the RR and the border device, enabling an ORF sending and receiving capability between the first PE device and the RR, and an ORF sending and receiving capability between the RR and the border device.

18. The method according to claim 11, wherein the BGP routing comprises one of the following: BGP label unicast routing, BGP Color-Aware Routing (CAR), and BGP Classful Transport (CT) routing.

19. An apparatus for receiving border gateway protocol routing, wherein located at a first Provider Edge (PE) device in a first domain, the apparatus comprises:
a service routing receiving module, configured to receive Virtual Private Network (VPN) service routing of a second PE device in a second domain, wherein the VPN service routing comprises an address of the second PE device;
a strategy generation module, configured to generate an Outbound Route Filtering (ORF) entry strategy according to the VPN service routing, and send the ORF entry strategy to a border device, wherein the ORF entry strategy comprises the address of the second PE device; and
a Border Gateway Protocol (BGP) routing receiving module, configured to receive BGP routing matching the ORF entry strategy and sent by the border device.

20. A computer non-transitory readable storage medium, wherein a computer program is stored in the computer readable storage medium, and the computer program is configured to cause, when executed by a processor, the processor to perform steps of the method as claimed in claim 11.

* * * * *